March 25, 1930.  F. MORENO  1,752,192
FAN
Filed April 30, 1928
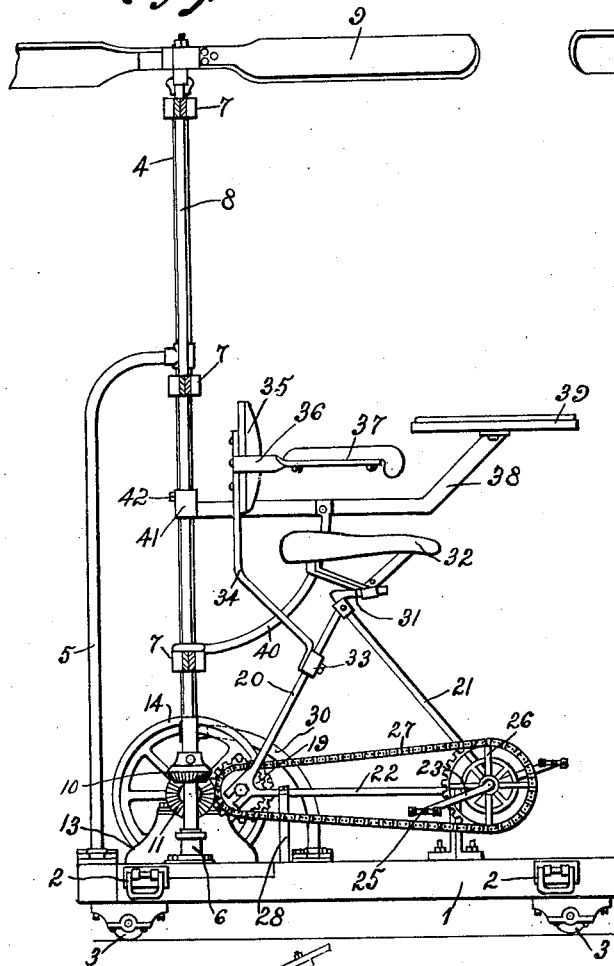
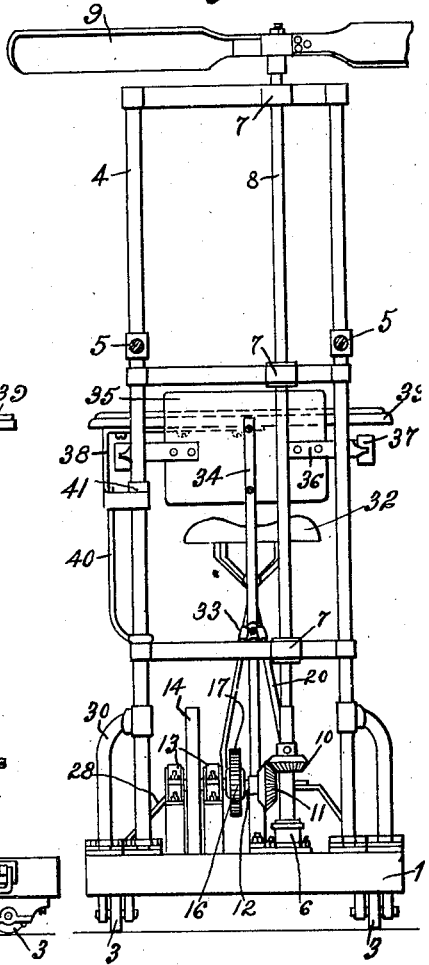

Patented Mar. 25, 1930

1,752,192

UNITED STATES PATENT OFFICE

FIÁCRO MORENO, OF TORREON, MEXICO

FAN

Application filed April 30, 1928. Serial No. 273,956.

My present invention has reference to what I will term a convertible fan.

My object is to arrange upon a wheeled platform a seat, a back rest for the seat, arm rests at the side of the seat and a table forward of the seat, all of which elements are adjustable, and to arrange to the rear of the seat a shaft that has fan blades secured thereon, and which shaft is rotatable by pedal operated means in convenient position with respect to the occupant of the seat, so that the occupant while comfortably seated may create a circulation of air when writing or reposing, the improvement being especially but not necessarily designed for use in tropical countries where electric current is not available.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 1 is a side elevation of the improvement.

Figure 2 is an end view thereof.

Figure 3 is a sectional view on the line 3—3 of Figure 1.

The base or platform 1 of the improvement is of substantially rectangular formation and is preferably of wood. The base may have fixed on its sides hingedly supported handles 2 whereby the device may be lifted. On the under face of the base there is journaled in suitable bearings the shafts for front and rear wheels or rollers 3.

Arising from the base, adjacent to the rear thereof there is a substantially rectangular frame which is broadly indicated by the numeral 4. The frame is preferably constructed of light pipe sections which are suitably coupled and certain of these couplings connect to the uprights of the frame the transverse element thereof. The frame is effectively supported in a vertical position by brace means 5 which is also preferably in the nature of a pipe or pipes connected to both the frame and to the base. There is journaled in the lower bearing 6 which is fixed to the frame and in bearings 7 that are fixed to the cross members of the frame a shaft 8. The shaft 8 has secured upon its upper end the central portion or hub for fan blades 9.

Fixed on the shaft 8 there is a gear 10 which is in mesh with a similar gear 11 on a cross shaft 12. The shaft 12 is journaled in suitable bearings 13 whose lower portions are fixed on the base 1 and the said shaft carries a fly wheel 14. Also fixed on the shaft 12 there is a pinion 16 which is in mesh with a gear 17 that is mounted on one end of a second cross shaft 18, the latter being supported in suitable bearings and having fixed thereon a sprocket wheel 19. The shaft 18 is received in the notched ends of the angle fork members 20 of an angular frame such as is ordinarily employed in bicycle constructions. The outer angle bar of this frame is indicated by the numeral 21 and the connecting bar between the forks and the said upper bar is indicated by the numeral 22. At the juncture of the bars 21 and 22 there is a bearing opening for a crank shaft, the said shaft being mounted on the usual ball or roller bearings (not shown). The cranked ends 23 of this shaft have swingably supported thereon pedals 25. The crank shaft has also fixed thereon a sprocket wheel 26 which is arranged directly opposite the sprocket wheel 19 and trained around these sprocket wheels there is a sprocket chain 27. The bicycle frame is suitably supported by means 28 that arise from but are fixed to the base 1 and preferably there is a curved brace member 30 between the base and the shaft 8 and the upper end of the brace 30 being provided with a bearing through which the shaft passes.

The angle and adjustable seat bar which is received in the tubular member 21 of the bicycle frame is indicated for distinction by the numeral 31 and supports thereon a seat 32. As far as the description has progressed it will be apparent that a person occupying the seat and actuating the pedals will cause the turning of the shaft 8 and consequently the turning of the fan blades so that the air will be circulated around the operator, the fan blades being canted or tilted to direct the air currents downwardly.

Adjustably fixed on the forked portion 20 of the bicycle frame by binding means 33 there is an upwardly extending plate 34. This plate, from adjacent its adjustable connection with the bicycle frame, is disposed at a rearward angle but the upper portion thereof is straight and has fixed thereon a back rest 35. The rear of the back rest has preferably adjustably secured thereon the angle supports 36 for arm rests 37, the arm rests being, of course, disposed to the opposite sides of the seat 32 and affording a support for the arms of the occupant of the seat.

Swingably and vertically adjustably supported upon one of the uprights of the frame 4 there is a bar 38 having its outer end disposed at an upward angle and from thence offset, and to this offset portion there is fixedly secured a table 39. A curved brace 40 is provided between the bar 38 and is slidable upon the said post or upright of the said frame 4 and the binding means that passes through the collar 41 on the bar for the upright or post of the frame 4 is for distinction indicated by the numeral 42.

From the foregoing it will be obvious that the improvement may be rolled to any desired place and that the occupant of the seat 32 may, by turning the crank shaft through the medium of the pedals 25, create a circulation of air from the fan blades 9. It will be apparent that the improvement may be employed for writing purposes by the occupant of the seat, as well as for permitting the occupant to rest and recline on the device in a comfortable manner.

Having described the invention, I claim:

A device for the purpose set forth comprising a platform, a tubular frame arising from one end thereof, a shaft guided through the frame and having a bearing support on the platform and said shaft having a fan on the upper end thereof, a gear on the shaft, intermeshing gears coengaging with the shaft gear, a sprocket on the shaft of one of the intermeshing gears, a pedal operated sprocket wheel having an endless chain trained thereover and trained over the first mentioned sprocket and a seat above the last mentioned sprocket.

In testimony whereof I affix my signature.

FIACRO MORENO.